(12) United States Patent
Place et al.

(10) Patent No.: US 6,261,590 B1
(45) Date of Patent: *Jul. 17, 2001

(54) METHODS FOR THE ENRICHMENT OF LIVE FEED WITH NUTRIENTS ESSENTIAL FOR FISH LARVAE

(75) Inventors: Allen R. Place, Baltimore, MD (US); Sureyya Ozkizilcik, Izmir (TR); Moti Harel, Baltimore, MD (US)

(73) Assignee: University of Maryland Biotechnology Institute, Baltimore, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/240,697

(22) Filed: Feb. 2, 1999

Related U.S. Application Data

(63) Continuation-in-part of application No. 09/010,485, filed on Jan. 21, 1998, now abandoned.

(51) Int. Cl.[7] .............................. A23K 1/17; A23K 1/165
(52) U.S. Cl. ......................... 424/442; 424/489; 424/498; 426/1; 426/2; 426/72; 426/805
(58) Field of Search ............................ 426/1, 2, 72, 805; 424/489, 498, 442

(56) References Cited

U.S. PATENT DOCUMENTS

| | | | |
|---|---|---|---|
| 4,906,479 | * 3/1990 | Kitagawa et al. | 426/1 |
| 4,931,291 | 6/1990 | Kojima et al. | 426/2 |
| 4,960,795 | 10/1990 | Salte et al. | 514/560 |
| 5,158,788 | 10/1992 | Lavens et al. | 426/2 |

FOREIGN PATENT DOCUMENTS

| | | |
|---|---|---|
| 6-319465 | 11/1994 | (JP) . |
| 8-275734 | 10/1996 | (JP) . |
| 10-276684 | 10/1998 | (JP) . |

OTHER PUBLICATIONS

Dialog(R) File 203: AGRIS No.: 1998–043115, Estevez et al., Fisheries Science, Feb. 1996, v. 62(1), pp. 88–93 (abstract).*

T. Watanabe; "Importance of Docosahexaenoic Acid in Marine Larval Fish"; 1991; p. 19.
M.J. Fernandez–Reiriz et al.; "Nutritional Quality of Artemia During Enrichment and Starvation"; 1991; 48–50.
J. Dhont et al.; "Development of a Lipid–Enrichment Technique . . . "; 1991; pp. 51–55.
T. Watanabe and V. Kiron; "Prospects in Larval Fish Dietetics"; 1994; pp. 223–251.
D.A. Jones et al.; "The Potential for Replacement of Live Feeds in Larval Culture"; 1991; p. 141.
L.A. McEvoy et al.; "Two Novel Artemia Enrichment Diets Containing Polar Lipid"; pp. 1–20, No month and year provided.
Paul S. Schauer et al.; "International Study on Artemia"; 1980; pp. 365–373.
G.C. Sasaki and J.M. Capuzzo; "Degradation of Artemia Lipids Under Storage"; 1984; pp. 525–531.
T. Watanabe, et al.; "Relationship Between Dietary Value of Brine Shrimp . . . "; 1980; pp. 35–41.
Phillippe Leger et al.; "International Study on Artemia"; 1987; pp. 411–424.
L.A. McEvoy et al.; "Autoxidation of Oil Emulsions During . . . "; 1995; pp. 101–112.
Carl D. Webster and Richard T. Lovell; "Response of Striped Bass Larvae Fed Brine Shrimp from Different Sources Containing Different Fatty Acid Compositions"; 1990; pp. 49–61.
Paul C. Southgate and Dong C. Lou; "Improving the n–3 HUFA Composition of Artemia using Microcapsules Containing Marine Oils" 1995; pp. 91–99.
J.C. Navarro et al.; "A Study of the Variations in Lipid Levels . . . " 1991; pp. 461–465.

* cited by examiner

Primary Examiner—Dwayne C. Jones
Assistant Examiner—C. Delacroix-Muirheid
(74) Attorney, Agent, or Firm—Steven J. Hultquist

(57) ABSTRACT

A method of enriching fish food and live larval fish prey, especially Artemia nauplii and rotifers, with essentially highly unsaturated fatty acids, vitamins, amino acids, carotenoids and pigments. The live prey are allowed to ingest/adsorb dry soap powders of highly unsaturated fatty acids obtained from the waste stream of marine algae oil extraction. The live prey can be highly enriched in docosahexaenoic acid obtaining ratios of docosahexaenoic acid to eicosapentaenoic acid greater than about 2.0 to 1.0.

28 Claims, 6 Drawing Sheets

METHODS FOR THE ENRICHMENT OF LIVE FEED WITH NUTRIENTS ESSENTIAL FOR FISH LARVAE

This is a continuation-in-part application of Ser. No. 09/010,485, filed Jan. 21, 1998 now abandoned, which is herein incorporated by reference in its entirety.

FIELD OF THE INVENTION

This invention relates to the enrichment of fish food including rotifers, Artemia, copopods and other live prey foods with nutrients essential for fish larvae including essential amino acids, vitamins and highly unsaturated fatty acids. The invention further relates to the bioencapsulation of antibiotics or other medicines used to treat fish.

BACKGROUND OF THE INVENTION

The rapid expansion of the aquiculture of fish and shrimp has been slowed by the persistent difficulties in raising larval fish such as sea bream, sea bass, mullet, halibut and striped bass. Fish require live prey during the larval stage of development. To be acceptable to larval fish the prey must be the proper size, shape and be palatable. The live prey must also be available at an acceptable price and quality, be amenable to culture on a commercial scale and not present other problems to the fish hatchery such as contamination of the larval fish rearing tanks. The favored live prey of fish hatcheries for larval fish has included rotifers, Artemia nauplii and copepods, although other types of live prey have also been used as food. A problem with Artemia is that the nutritional composition of the Artemia is determined by the nutritional composition of the Artemia eggs before the Artemia hatches and, in turn, the nutritional composition of the Artemia laying the eggs. In addition the quality of commercially available Artemia eggs is decreasing due to increased demand. With Artemia, the nauplii are fed to the larval fish shortly after hatching and before the nauplii have the opportunity to grow.

In addition to requirements of energy and protein, marine larval fish also require highly unsaturated fatty acids (HUFA) as essential fatty acids. In the wild, marine larval fish obtain their requirements of HUFAs from copepodites and marine algae. Within the group of highly unsaturated fatty acids, larval marine fish require more docosahexaenoic acid (DHA) than eicosapentaenoic acid (EPA) as an essential fatty acid. Some species of fish may also require arachidonic acid (ARA) as an essential fatty acid. The enrichment of Artemia with HUFA has been reported using enrichment techniques with microparticle diets and emulsions rich in n-3 HUFA esters or using algal species rich in n-3 HUFAs. A problem with these microparticle diets and emulsions is the high cost of the fish oil used to enrich the microparticles with the HUFAs. Another problem is that the oil droplets have a limited capacity to load various nutrients into the droplet and are totally unsuitable for carrying water soluble nutrients such as essential amino acids.

The enrichment of Artemia nauplii using algae has many problems. One problem is that the algae can contribute to fouling of the larval rearing tanks. See C. M. Hernandez-Cruz et al. Larvi '95 Fish and Shellfish Larviculture Symposium pp 511–514, herein incorporated by reference, reporting that enriching rotifers with lipid emulsions leads to an increase in the number of bacteria associated with the rotifers which may affect the bacterial flora of the larval rearing tank.

J. O. Eujemo et al. in Larvi '95 Fish and Shellfish Larviculture Symposium pp 109–110 report that "docosahexaenoic acid (DHA), is more important than eicosapentaenoic acid (EPA) for the physiological function of marine fin fish larvae, including survival, growth and pigmentation success. However, contrary to other live feeds, the enrichment of Artemia with DHA is difficult because of the inherent catabolism of the latter fatty acid upon enrichment. These problems, as well as others, have prevented the enrichment of live feeds with DHA."

OBJECTS AND SUMMARY OF THE INVENTION

An object of the invention is to provide a method of enriching Artemia and other live prey with HUFA, increase the ratio of DHA to EPA and produce an enriched Artemia or other live prey.

Another object of the invention to use HUFA soap powders to enrich rotifers, Artemia and other live prey.

A still further object of the invention is to use HUFA soap powders to encapsulate essential amino acids, drugs, vitamins and other nutrients.

A still further object of the invention is the use of HUFA soap powders as a feed additive to a microparticle diet for larval fish.

A further object of the invention is to utilize HUFAs recovered from a waste stream.

A still further object of the invention is to use HUFA-containing soap powders as vehicles for the bioencapsulation of drugs, vitamins, carotenoids, pigments and essential amino acids in prey for administration to larval fish.

These and other objects of the invention have been achieved by the invention are hereinafter described.

In sum, we have discovered that Artemia and other live prey is enriched with HUFAs and that the ratio of DHA to EPA is increased by feeding the live prey dried soap powders containing HUFA. In this manner, we have avoided prior art problems associated with enriching live prey with HUFAs. After the live prey has ingested or absorbed a sufficient amount of the desired fatty acids the prey is then fed to the larval fish.

The live prey that can be enriched with the HUFA soap powders include Artemia nauplii, rotifers and copepods. After enrichment, the live prey generally has a ratio of docosahexaenoic acid (DHA) to eicosapentaenoic acid (EPA) greater than about 1:1. Preferably, the ratio of DHA to EPA is greater than about 1.5 to 1.0 and even more preferably the ratio to DHA to EPA is greater than about 2.0 to 1.0 after enrichment of the prey.

Enrichment of live prey with HUFA can be easily accomplished by feeding the live prey with highly unsaturated fatty acid soap powders which can be made from the lipids extracted during the alkaline wash of fish and algae oils. The alkaline wash removes the free fatty acids and phospholipids from the derived oils and is usually discarded as a waste material. The highly unsaturated fatty acid soaps, as an aqueous alkaline solution, can also be obtained from Martek Bioscience of Columbia, Md. as a byproduct of Martek's polyunsaturated fatty acid extraction process from marine algae. These fatty acids are extracted during the winterization and alkaline working of algae oils by Martek or the winterization and alkaline washing of crude fish oils.

The normal counter-ion in the soap is usually sodium but other counter-ions such as potassium and calcium can also be used as well as mixtures of these counter-ions. Calcium is a preferred counter-ion because calcium soaps are highly insoluble in water and larval fish require calcium for bone development. The choice of counter-ions can also be determined by the needs of the larval fish as well as the ability of the live prey to absorb the fatty acid in the presence of the counter-ions.

The high unsaturated fatty acid soap powder should have a ratio of about 1 to 1 docosahexaenoic acid (DHA) to eicosapentaenoic acid (EPA), preferably, greater than bout 1.5 to 1.0, and a ratio of than about 2.0 to 1.0 is most preferred.

The fatty acid composition of the soaps can be varied but preferably comprise; from about 8% to about 16% C14:0, from about 0.75% to about 2.50% C16:1ω7, from about 9% to 13% C16:0, from about 7.5 to 10.5% C18:2ω6, from about 30 to 55% C18:1ω9, from about 0.01% to about 2.5% C18:1ω7, from about 2% to about 4.5% C20:4 and from about 8.5 to about 28% C22:6ω3. However, it should be emphasized that the composition of the soap can be varied depending on the nutritional needs of the larval fish species.

The aqueous alkaline solution of fatty acid soaps can be dried and converted into a soap powder by a conventional spray drying process. The hydrated particle size can vary but should be no larger than about 10 microns, preferably less than about 7.5 microns, and most preferred is a particle size in the range of about 1 micron to about 5 microns. Any conventional counter-ion can be used but sodium and potassium are preferred and most preferred is calcium. Calcium is preferred since calcium salts of soaps are much more insoluble in water and because the calcium is needed for the formation of bone. Drugs, vitamins, carotenoids and/or pigments are usually added to the aqueous soap solution before the spray drying process, however drugs, vitamins, amino acids, carotenoids and/or pigments could also be added to the soap powder after drying. The drugs that can be incorporated include antibiotics, antifungal, and other approved drugs. The vitamins include vitamin A, $B_{12}$, E, D, and the fatty acid derivatives of ascorbic acid.

Amino acids such as methionine, cysteine and other essential amino acids can be added to the fatty acid soaps before the spray drying process. The carotenoids and pigments include α-carotene, β-carotene, canthaxanthin, astaxanthin, astaxanthin mono or di ester, dosadexanthin, idoxanthin, zeaxanthin and xanthophylls. Preferably, the carotenoids are in the free form and are not esterified with fatty acids.

The addition of drugs, vitamins, carotenoids and pigments to the soap powders allows the live prey to act as biocapsules in administering these agents to larval fish. In particular live foods such as rotifers, Artemia nauplii and copepods are preferred for this role because of the increased palatability of these foods to larval fish. The dried soap powder can also be mixed with artificial fish food or fed directly to larval fish as part of an artificial micro-particulate diet. The addition of the dried soap powder that includes amino acids to dried or semi-moist fish foods is one of the few methods of enriching fish food with amino acids because the amino acids are water soluble. In this manner both highly unsaturated fatty acids and essential amino acids as well as other water soluble compounds can be administered to fish via an enriched fish food.

DESCRIPTION OF THE PREFERRED EMBODIMENTS

A. Method for Making HUFA—Soap Powder

Figure 1:
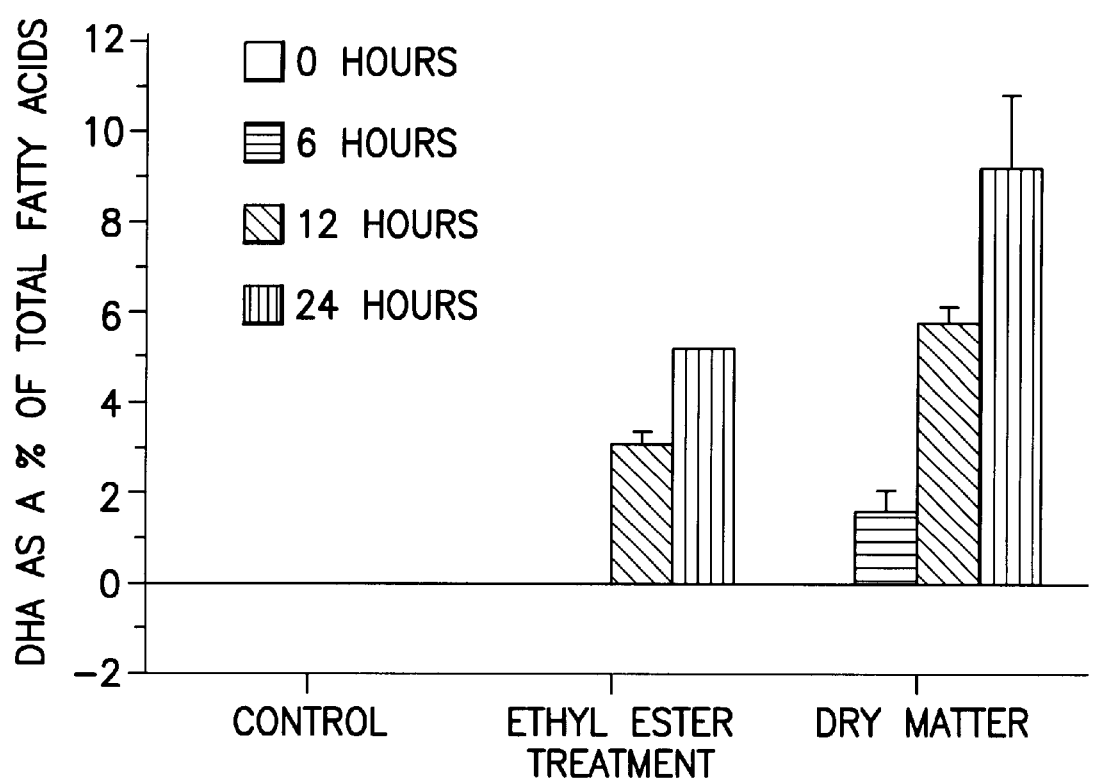
FIG. 1 is a graph showing the effects over time of treating Artemia nauplii with the soap powder of the invention compared to ethyl ester emulsions of the soap powders and an untreated control. The graph shows the enrichment of DHA as a percentage of total fatty acids at zero, six, twelve and twenty four hours. The error bars show the standard error of the measurement.

The alkaline wash (soaps) and winterization solid waste of the Martek DHAsco and ARAsco oils were found to be about 75% water and had the following general lipid composition as shown in Table 1.

TABLE 1

| COMPOSITION | SOAPS (Weight % of lipids) | SOLIDS (Weight % of lipids) |
| --- | --- | --- |
| Sterol/Wax esters | 1.88 | 3.10 |
| Triglycerides | 45.27 | 85.60 |
| Fatty acids | 27.70 | 0.98 |
| Sterols | 4.18 | 1.42 |
| Phospholipids | 20.97 | 8.89 |

When the soaps were washed with cold acetone at pH 4.0, the phospholipids and fatty acids were encapsulated and could be recovered. The fatty acid content of the original material and the material obtained after acetone washing is shown in Table 2. However, recovery was not quantitative and the soaps alone were used for enrichment.

TABLE 2

| Fatty Acid Composition | Before Acetone Wash (Weight % of total fatty acids) | After Acetone Wash (Weight % of total fatty acids) |
| --- | --- | --- |
| C14:0 | 14.87 | 9.02 |
| C16:1ω7 | 2.09 | 1.06 |
| C16:0 | 11.93 | 11.86 |
| C18:2ω6 | 9.1 | 8.43 |
| C18:1ω9 | 35.62 | 49.17 |
| C18:1ω7 | 0.5 | 1.86 |
| C20:4 | 2.46 | 3.51 |
| C22:6ω3 | 23.44 | 13.5 |

To examine the enrichment of Artemia nauplii, an emulsion of the acetone washed soap (1.6 gm soap with 8.4 g DHAsco oil) mixed with DHAsco oil was compared to an emulsion of menhaden oil (Zapata) (0.75 gm soaps and 2.25 gm menhaden oil).

The fatty acid content of these emulsions is shown in Table 3.

TABLE 3

| Fatty Acid | Soap and DHAsco Oil* | Soap and Menhaden Oil* | Menhaden Oil* |
|---|---|---|---|
| C14:0 | 12.46% | 8.19% | 7.04% |
| C16:2 | 0%% | 1.53% | 1.86% |
| C16:1 | 0% | 9.31% | 10.55% |
| C16:1ω7 | 1.66% | 1.35% | 1.56% |
| C16:2 | 0% | — | — |
| C16:0 | 17.13% | 18.68% | 19.42% |
| C18:3 | 0.36% | 3.15% | 3.72% |
| C18:2ω6 | 1.77% | 2.36% | 2.06% |
| C18:1ω9 | 18.32% | 13.49% | 9.91% |
| C18:1ω7 | 0% | 2.84% | 3.27% |
| C18:0 | 1.95% | 3.27% | 3.61% |
| C20:6 | 0% | 0% | 0% |
| C20:5ω3 | 5.68% | 10.09% | 12.16% |
| C20:4 | 0.3% | 1.49% | 1.82% |
| C20:3 | 0% | 0.26% | 0.32% |
| C20:2 | 0% | 0% | 0% |
| C20:1 | 0% | 1.18% | 1.41% |
| C22:6ω3 | 37.33% | 16.941% | 11.41% |
| C22:5 | 0.62% | 2% | 2.28% |
| DHA/EPA | 6.572 | 1.678 | 0.938 |

*The values given are in weight % of total fatty acids.

B. Method of Enriching Live Prey Using HUFA-Enriched Soap Powder

The Artemia were enriched by the following process:

1. Hatch Artemia in 1 liter containers with 26 ppt aqueous salt concentration at 26° C. for 24 hours.
2. Separate newly hatched nauplii from unhatched eggs and place the nauplii in a tank.
3. Let the nauplii advance to the third naupliar stage in the next 18 to 24 hours.
4. Place 10 g of the desired lipid into a blender, add 200 to 300 ml of culture water and emulsify the mixture for one minute.
5. Let the nauplii adsorb/ingest the emulsion at a concentration of 0.1 gram of emulsion per liter solution for the next 12–24 hours.
6. Collect enriched nauplii and rinse briefly under running water.
7. Add enriched Artemia to the larval fish tanks.

The nauplii were examined after three hours and six hours to see if any enrichment had taken place. Table 4 summarizes the fatty acid composition (in weight percent of lipid) of the nauplii after treatment with the emulsified soaps. As observed a significant enrichment of the nauplii with DHA occurs.

TABLE 4

Fatty Acid Composition* of Nauplii as a Function of Time

| Fatty Acids Composition | Time 0 | After 3 hrs – Control | After 3 hrs Soap + DHAsco | After 6 hrs | After 6 hrs Soap + DHAsco |
|---|---|---|---|---|---|
| C14:0 | 0.45% | 0.43% | 4.55% | 0.00% | 4.93% |
| C16:2 | 0.64% | 0.64% | 0.6% | 0.55% | 0.59% |
| C16.1 | 2.67% | 2.71% | 2.25% | 1.31% | 2.04% |
| C16:1ω7 | 0.00% | 0.00% | 0.00% | 0.00% | 0.00% |
| C16:0 | 9.88% | 10.32% | 10.97% | 5.48% | 9.94% |
| C18:3 | 4.84% | 5.26% | 2.89% | 2.32% | 3.20% |
| C18:2ω6 | 5.79% | 5.93% | 4.47% | 2.98% | 4.07% |
| C18:1ω9 | 30.16% | 45.24% | 36.44% | 22.56% | 33.25% |
| C18:1ω7 | 14.14% | 8.82% | 5.43% | 4.89% | 4.87% |
| C18:0 | 8.79% | 8.85% | 5.77% | 5.14% | 5.07% |
| C20:6 | 1.31% | 0.00% | 0.00% | 0.00% | 0.00% |
| C20:5ω3 | 0.30% | 1.51% | .96% | .97% | 1.16% |
| C20:4 | 0.00% | 0.00% | 0.00% | 0.00% | 0.9% |
| C20:3 | 0.00% | 0.00% | 0.00% | 0.00% | 0.00% |
| C20:2 | 0.00% | 0.00% | 0.00% | 0.00% | 0.00% |
| C20:1 | 0.00% | 0.00% | 0.00% | 0.00% | 0.00% |
| C22:6ω3 | 0.00% | 0.00% | 9.92% | 0.00% | 9.33% |
| C22:5 | 0.00% | 0.00% | 0.00% | 0.00% | 0.9% |
| DHA/EPA | 0 | 0.00 | 10.33 | 0.00 | 10.36 |

*Weight percent of lipid.

Unfortunately, it was also discovered that the emulsions reported in Table 4 were toxic to the Artemia after about 6 hours exposure.

Surprisingly, the dry soaps were not toxic to the nauplii when fed to the nauplii or placed in the same tank as the nauplii. Therefore, to avoid the toxic effect of the emulsions the powdered dry soap were used for the enrichment of nauplii. To compare the enrichment effect, ethyl esters of the HUFA soaps were prepared and emulsified by adding 3% Tween-80, followed by vigorous agitation. The dry HUFA soaps and ethyl esters of the HUFA soaps were separately suspended at a 1 g/liter concentration with Artemia nauplii and compared over a twenty four hour period. The results are shown in Table 5. It is noteworthy that the Artemia in both the ethyl ester emulsions or the HUFA soaps showed no significant mortality over the twenty four hour period of the enrichment.

TABLE 5

| Time | EPA Control % total lipid | Dry soaps % total lipid | EE emulsion % total lipid | DHA Control % total lipid | Dry soaps % total lipid | EE emulsion % total lipid | DHA/EPA Control % total lipid | Dry soaps % total lipid | EE emulsion % total lipid |
|---|---|---|---|---|---|---|---|---|---|
| 0 | 3.71 | | | 0.00 | | | 0 | | |
| 6 | 4.06 | 4.11 | 4.04 | 0.00 | 0.79 | 1.12 | 0 | 0.19 | 0.28 |
| 12 | 4.01 | 3.86 | 3.69 | 0.00 | 5.61 | 3.13 | 0 | 1.45 | 0.85 |
| 24 | 3.40 | 3.70 | 3.67 | 0.00 | 8.94 | 5.09 | 0 | 2.42 | 1.39 |

As seen in Table 5, the nauplii that received a 24hour enrichment program with the dry soaps resulted in a considerably enriched DHA level compared to the ethyl ester emulsion. Additionally, the soaps showed significantly improved DHA/EPA ratio enrichment compared to the ethyl ester emulsion over the twenty four hour enrichment period.

Figure 2:
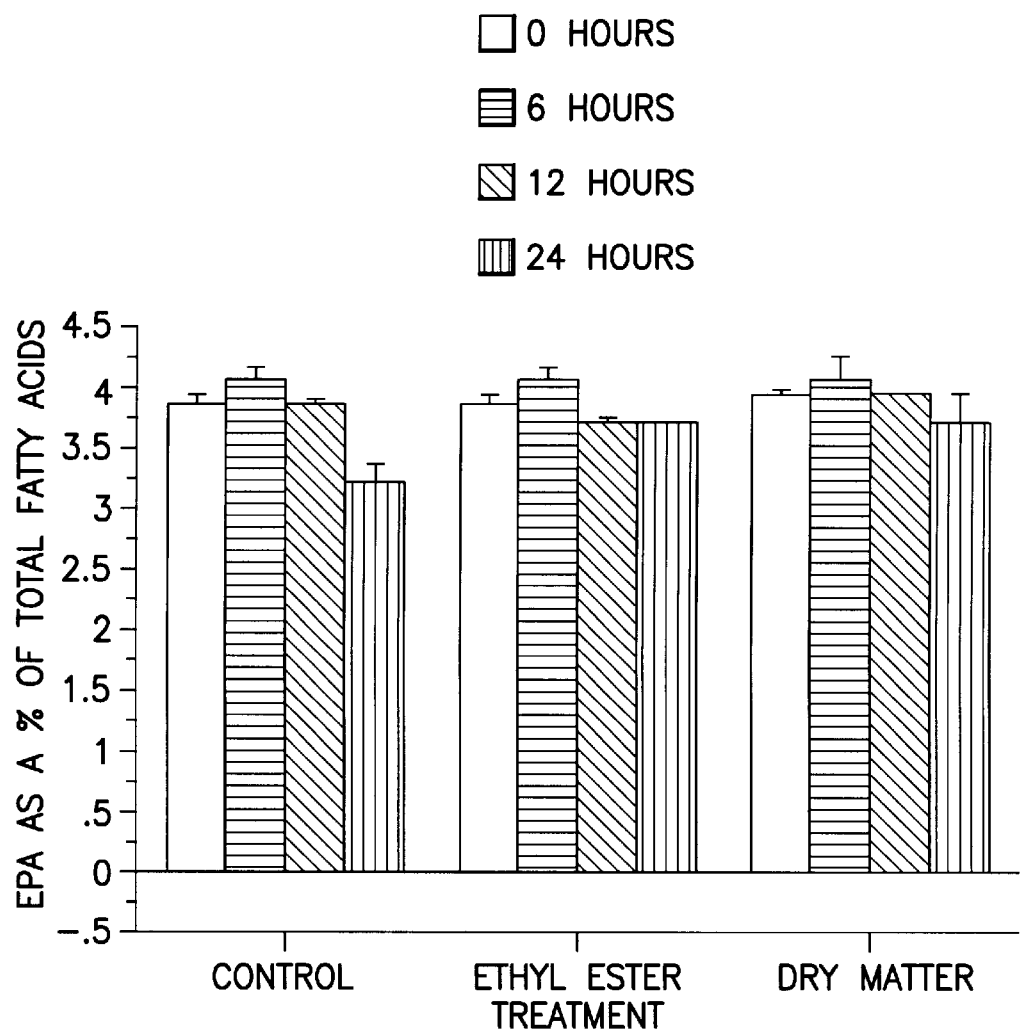
FIG. 2 is a graph showing the effects over time of treating Artemia nauplii with the soap powder of the invention compared to ethyl ester emulsions of the soap powders and an untreated control. The figure shows the percentage of EPA as a percentage of total fatty acids at zero, six, twelve and twenty four hours. The error bars show the standard error of the measurement.
Figure 3:
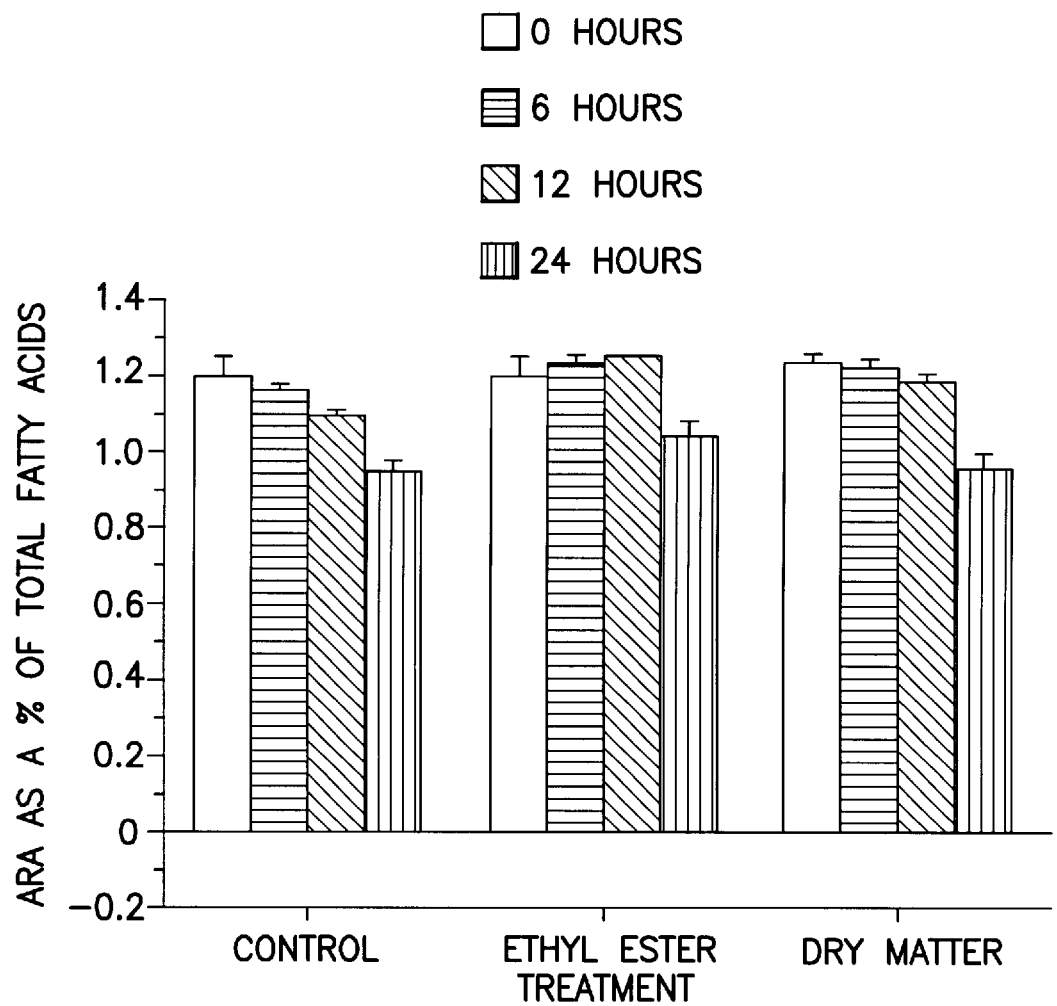
FIG. 3 is a graph showing the effects over time of treating Artemia nauplii with the soap powder of the invention compared to ethyl ester emulsions of the soap powders and an untreated control. The figure shows the percentage of arachidonic acid (ARA) as a percentage of total fatty acids at zero, six, twelve and twenty four hours. The error bars show the standard error of the measurement.

The experiment was repeated in triplicate. The following results, shown in FIGS. 1–3 were obtained for total lipid enrichment using the dried fatty acid soaps. FIG. 1 shows the DHA as a percentage of total fatty acid over time for nauplii administered the HUFA soap powder of the invention, compared to nauplii administered an ethyl ester emulsion of the invention and a control group. As is apparent from FIG. 1 the Artemia nauplii administered the HUFA soaps increased their DHA levels as a percentage of total fatty acids more rapidly and acquired a higher total level of DHA when compared to the nauplii administered the ethyl esters of the HUFA soaps. FIG. 2 shows EPA as a percentage of total fatty acids over time for the three groups of nauplii; and FIG. 3 shows arachidonate acid (ARA) as a percentage of total fatty acids over time for the three groups of nauplii. It was observed that the EPA and arachidonic acid composition of the nauplii did not change as the DHA level increased.

The normal dry soap feeding procedure for Artemia nauplii is as follows:

1. Hatch Artemia in 1 liter containers with 26 ppt aqueous salt concentration at 26° C. for 24 hours.
2. Separate newly hatched nauplii from unhatched eggs and place the nauplii in a tank.
3. Let the nauplii advance to the third naupliar stage in the next 6 to 8 hours.
4. Add the dried soap powder to the surface of the tank.
5. Let the nauplii adsorb/ingest the emulsion at the desired concentration for the next 12–24 hours.
6. Collect enriched nauplii and rinse briefly under running water.
7. Add enriched Artemia to the larval fish tanks.

The effects of enriching second instar (second naupliar stage) Artemia nauplii as well as the comparing the use of DHA phospholipid (PL) and the DHA sodium salt (DHA-Na) on enrichment efficiency in a series of experiments.

Enrichment diets were applied in a completely randomize design and three replicates in three sets of experimental runs. The combined effect of dietary DHA-rich PL and DHA-Na salt on enrichment efficiency was evaluated in two sets of experiments. In the first set, different enrichment diets having varying proportions of DHA-Na salt (10, 20, or 30%) and DHA-rich phospholipids (DHA-rich triacylglycerols (TAG) and olive oil were used to adjust the dietary level of DHA to 32±2% of total fatty acids, Table 6). In a second set of experiments, equal amounts of ethyl-ester-DHA or DHA-Na (30% of total lipids) were combined with different proportions (10, 20, or 40% of total lipids) of soy lecithin at a constant DHA level of 21±1% of the total fatty acids (30% DHA-TAG and a complementary amounts of olive oil was used as a source of triacylglycerols, Table 6).

The absorption efficiency of DHA as a function of lipid fraction delivery form was evaluated in a third set of experiments. Diets having increasing levels of DHA (0–13.21% of total fatty acids) only in the triacylglycerol, phospholipid or the sodium-salts fraction of the enrichment lipids were formulated. Diets were adjusted with similar non-DHA containing fractions (e.g., olive oil, soy lecithin and oleic acid-sodium salt) to contain equal amounts of these three lipid fractions.

All diets were added with 2% polyoxyethylene sorbitan mono-oleate (TWEEN 80, Sigma, Mo. USA) and fed in three replicates to instar II-stage Artemia nauplii. Enrichment conditions were established at 28–30° C., in 20 ppt artificial sea water (200,000) nauplii/liter), provided with vigorous aeration and constant illumination by fluorescent light. Two equal portions of 0.3 g enrichment lipids were mixed with fresh water, homogenized for 15 seconds and fed to the Artemia nauplii at time 0 and 8 hour post instar-II stage.

Artemia length, weight and survival were recorded before being fed and at 8 and 16 hours post feeding. A sample of Artemia nauplii was removed from each container at times 0, 8 and 16 hours, washed with distilled water, dried with paper towels, placed into test tubes and immediately frozen on dry ice. The samples were freeze dried for 48 hours and kept at −80° C. for later analysis. Triplicate groups of 100 individuals each of the freeze-dried Artemia were weighed, to the nearest 0.1 μg for dry weight determination.

Total lipids were extracted from triplicate samples according to the method of (Folch et al. *J. Biological Chemistry* 226, 497–509 (1957) herein incorporated by reference). Lipid weight was determined gravimetrically and expressed as percent dry weight of Artemia. Lipid classes of the enriched Artemia nauplii were separated on Chromarods-S III and quantified with iatroscan TH-10 TLC/FID analyzer (Iatron Laboratories, Inc., Tokyo, Japan) equipped with HP 3390A integrator. Chromarods were initially focused twice in 1:1 chloroform:methanol to produce a narrow band of sample lipids, and developed in a solvent system containing hexane:diethyl-ether:formic acid (85:15:0.1) for 45 minutes. Standard curves (first order) of known amounts of L-α-phosphatidylcholine, tripalmitin, oleic acid, cholesteryl oleate and cholesterol (all obtained from Sigma, Mo. USA) were generated for each lipid class and used for quantification.

Fatty acid methyl esters (FAME) were prepared from total lipid extract according to Morrison and Amith, *J. Lipid Res.* 5, 600–608 (1964) herein incorporated by reference. The lipid extracts were saponified with saturated KOH in methanol and methylated with 12% $BF_3$/methanol. The fatty acid methyl esters were analyzed using a Hewlett-Packard 5890A gas chromatography, equipped with a flame ionization detector and a 30 m×0.25 mm ID capillary column with 0.25 μm film thickness (DB5, J&W Scientific, Folson, Calif. USA). The carrier gas was helium at a column pressure of 19 psi. Injector and detector temperature were 300° C. and the oven temperature was programmed from initial temperature of 35° C. to 180° C. in 20 minutes, from 180° C. to 235° C. in 2 minutes and from 235° C. to 275° C. in 20 minutes. Two internal standards, C19:0 and C21:0 were added to each sample for quantification, and the integrated peak areas of the fatty acid methyl esters were identified by composition with known standards.

Analysis of variance was used (ANOVA, Statview 4.5, 1995) to determine differences between and within treatment means of survival length, weight, lipid, lipid class and fatty acid percentages. Percentages data were normalized by arcsine transformation prior to analysis. When significant differences between the means were detected, a duncan's multiple range test was applied. A significance level of 95% ($P<0.05$) was used throughout.

TABLE 6

| Composition of Enrichment Diets (% of total lipids) | | | | | | |
|---|---|---|---|---|---|---|
| Oil Type | Diet #1 | Diet #2 | Diet #3 | Diet #4 | Diet #5 | Diet #6 |
| 1st Set of Experiments | | | | | | |
| DHA-TAG | 65 | 55 | 45 | 60 | 50 | 40 |
| DHA-PL | 5 | 5 | 5 | 10 | 10 | 10 |
| DHA-Na | 10 | 20 | 30 | 10 | 20 | 30 |
| Olive Oil | 20 | 20 | 20 | 20 | 20 | 20 |
| DHA[1] | 32.4 | 32.3 | 31.0 | 34.9 | 34.3 | 33.6 |

TABLE 6-continued

Composition of Enrichment Diets (% of total lipids)

| Oil Type | Diet #1 | Diet #2 | Diet #3 | Diet #4 | Diet #5 | Diet #6 |
|---|---|---|---|---|---|---|
| | 2nd Set of Experiments | | | | | |
| DHA-TAG | 30 | 30 | 30 | 30 | 30 | 30 |
| DHA-Na | 30 | — | 30 | — | 30 | — |
| EE-DHA | — | 30 | — | 30 | — | 30 |
| Soy lecithin | 10 | 10 | 20 | 20 | 40 | 40 |
| Olive Oil | 30 | 30 | 20 | 20 | — | — |
| DHA[1] | 20.2 | 21.2 | 21.1 | 21.7 | 22 | 20.8 |

[1]Percentage of total fatty acids.

Artemia nauplii increased in length from $624.3 \pm 10.0$ μm at instar-II stage to $911.1 \pm 12.6$ μm after 16 hours of enrichment regardless of dietary treatments ($P>0.05$). Average weight of Instar-II Artemia nauplii was $2.10 \pm 0.08$ μg dry weight, and did not change significantly after 16 hours of enrichment on any dietary treatment ($2.05 \pm 0.13$ μg dry weight, $P>0.05$). Survival after 16 hours of enrichment was $74.0 \pm 7.8\%$ and not significantly affected ($P>0.05$) by PL or fatty acid sodium salts levels in the enrichment diets (even at high levels of 30% and 40%, respectively). At the beginning of the feeding experiments (Instar-II stage), Artemia nauplii contained $16.28 \pm 0.15\%$ (dry weight) lipid, which decreased to $13.81 \pm 0.41\%$ after 16 hours of starvation. All dietary lipids were efficiently absorbed by Artemia nauplii, regardless of PL or fatty acid sodium salts content ($P>0.05$), which were concomitant with a significant increase in lipid content to $24.3 \pm 0.6\%$ dry weight after 16 hours of enrichment.

Enrichment lipids were accumulated mostly as TAG in Artemia lipids, while Artemia PL content did not respond to dietary PL changes and remained constant at $47.69 \pm 7.74$ mg/g dry weight ($P>0.05$). Furthermore, PL:TAG ratios in Artemia lipids at equal lipid content, were also affected by dietary changes in the PL fraction ($P>0.05$, Table 2). However, dietary inclusion of 30% DHA-Na, at any PL dietary level, was associated with a significantly higher ($P<0.05$) PL:TAG ratios in Artemia lipids as compared to dietary inclusion of 30% EE-DHA ($0.33 \pm 0.02$ and $0.24 \pm 0.01$, respectively, Table 7).

Figure 4:
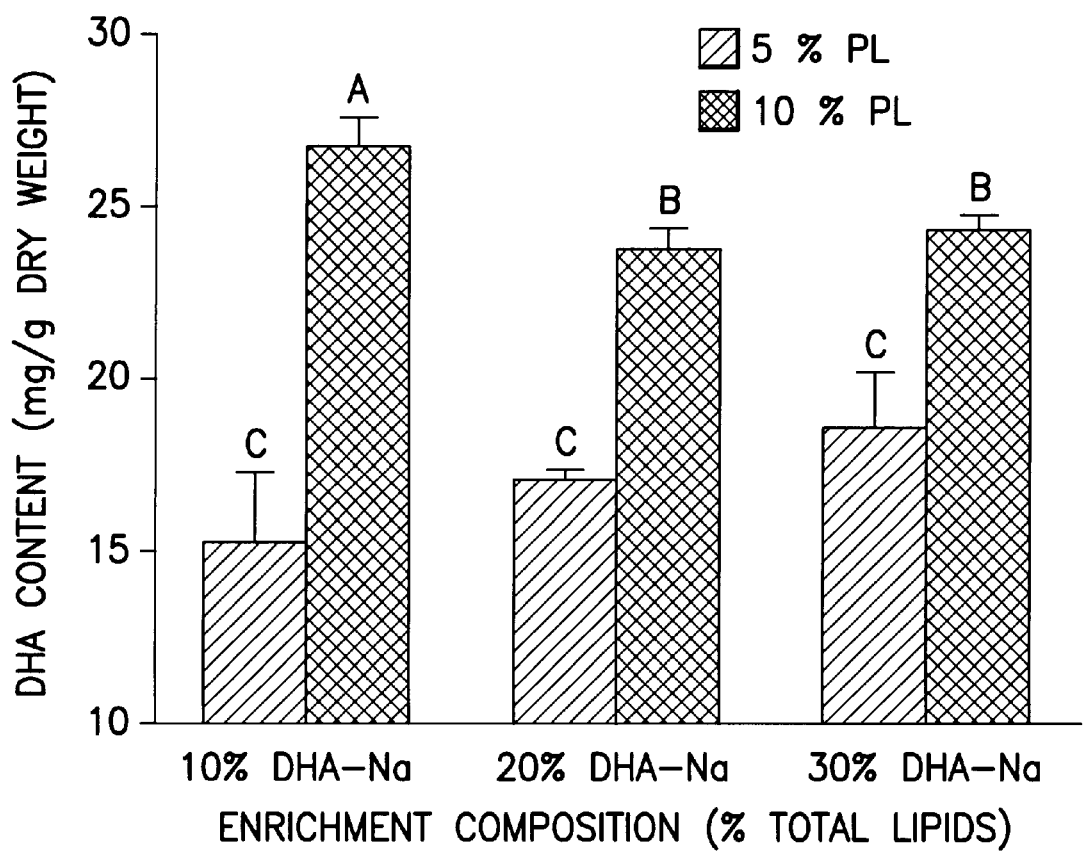
FIG. 4 is a graph showing the DHA enrichment of second instar Artemia nauplii as the percentage of DHA-sodium salt.
Figure 5:
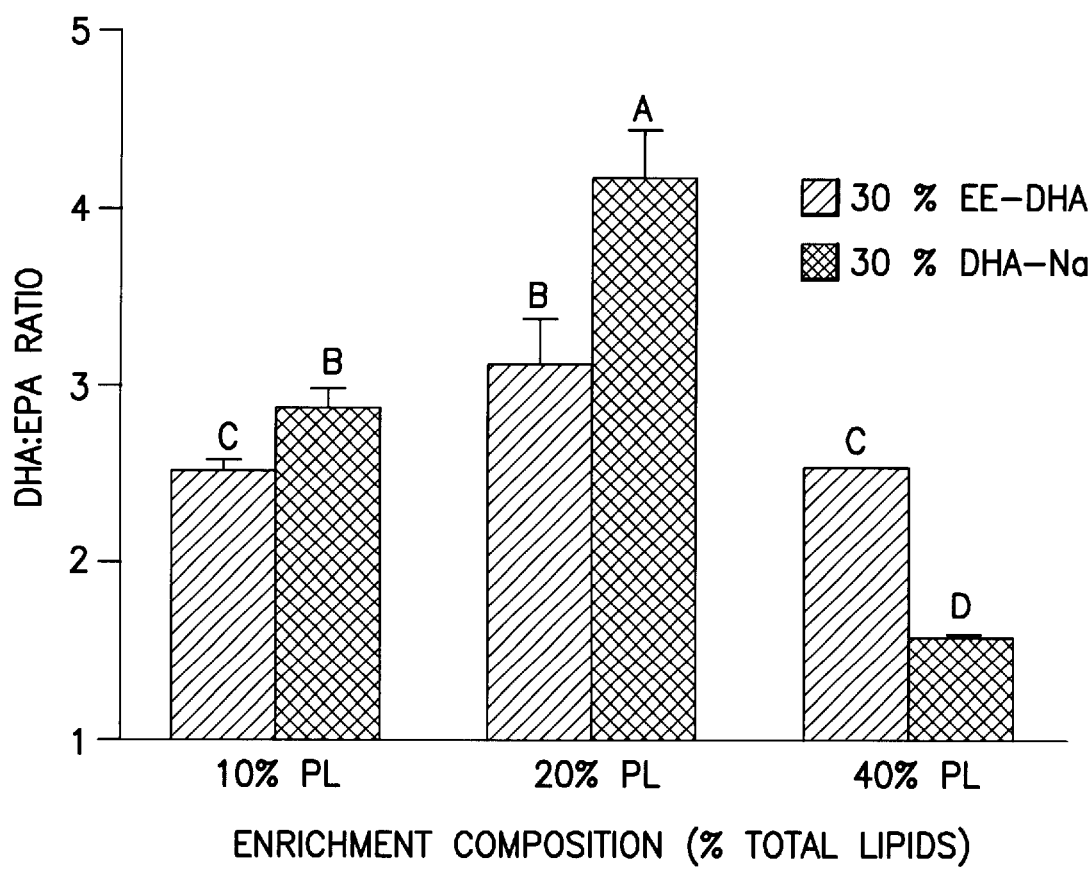
FIG. 5 is a graph showing the effect of dietary phospholipids at 30% ethyl ester DHA (EE-DHA) or 30% DHA-sodium salt (DHA-Na) levels on the DHA:EPA ratio in 16 hour enriched second instar Artemia nauplii.

Absorption of dietary DHA at 16 hours by enriched Artemia nauplii was significantly higher ($P<0.05$) when the lipid was delivered in its sodium-salt form when compared to the ethyl-ester form ($30.97 \pm 4.82$ mg/g dry weight and $23.76 \pm 3.06$ mg/g dry weight, respectively). In addition, DHA absorption by the Artemia was highest at 20% dietary PL, and substantially reduced at higher or lower dietary levels (Table 7). Alternatively, a mixture of 10% PL and 10% SS-DHA was resulted also in maximal ($P<0.05$) absorption of DHA in the enriched Artemia nauplii (FIG. 4). FIG. 4 describes the effects of dietary PL and DHA-sodium salt (DHA-Na) levels on DHA absorption by 16 hour enriched Artemia nauplii at the second instar stage. Percentage of dietary fractions are of total dietary lipids. Bars sharing the same superscript are not significantly different ($P>0.05$). Values are means±s.e. for three replicates. However, a combination of 20% dietary PL and 30% DHA-Na produced the highest ($P<0.05$) DHA:EPA ratio in the enriched Artemia nauplii as compared with any other combinations of PL and DHA-Na or EE-DHA (FIG. 5). FIG. 5 describes the effects of dietary PL at 30% ethyl-ester DHA (EE-DHA) or 30% DHA-sodium salt (DHA-NA) levels on DHA:EPA ratio in 16 hours enriched Artemia nauplii at the second instar stage. Percentage of dietary fractions are of total dietary lipids. Bars sharing the same superscript are not significantly different ($P>0.05$). Values are means±s.e. for three replicates.

TABLE 7

Effect of Varying Proportions of Dietary PL at 30% ethyl-ester DHA (EE-DHA) or 30% Sodium-Salt DHA (DHA-Na) on PL-TAG Ratio and DHA Absorption in Artemia

| % Dietary Soy-lecithin | PL:TAG at 30% EE-DHA | PL:TAG at 30% DHA-Na | DHA absorption (mg/g dry weight) |
|---|---|---|---|
| 10 | $0.26 \pm 0.01^B$ | $0.33 \pm 0.01^A$ | $25.89 \pm 3.60^{AB}$ |
| 20 | $0.24 \pm 0.01^B$ | $0.32 \pm 0.05^A$ | $35.74 \pm 7.87^A$ |
| 40 | $0.25 \pm 0.02^B$ | $0.34 \pm 0.02^A$ | $20.96 \pm 2.98^A$ |

Percentage of dietary fractions are of total dietary lipids.
Values in each column sharing the same superscript are not significantly different ($P > 0.05$). Values are means ± s.e. for three replicates.

EPA content in instar-II stage Artemia nauplii was $8.14 \pm 0.42$ mg/g dry weight, and was reduced slightly to $7.20 \pm 0.61$ mg/g dry weight after 16 hours of starvation. On the other hand, EPA content nearly doubled to $13.82 \pm 0.23$ mg/g dry weight after 16 hours of DHA enrichment with no significant effect by PL or DHA-Na dietary levels ($P>0.05$). Since dietary lipids were lacking EPA (less than 0.5% of total fatty acids), the increase in EPA content resulted from DHA metabolism and retroconversion in the enriched Artemia. Although the additional EPA originated mostly from retroconverted DNA, no correlation between levels of the two was observed ($R^2=0.32$). FIG. 5 shows the DHA:EPA ratio in enriched Artemia as a function of dietary PL and sodium-salt DHA contents. High dietary levels of PL (40% of total lipids) significantly affect DHA absorption consequence with lower DHA:EPA ratios in the enriched Artemia. Nevertheless, DHA:EPA ratio in Artemia was significantly higher ($P<0.05$) when fed on 10–20% PL associated with 30% sodium-salt DHA than with 30% ethyl-ester DHA.

Figure 6:
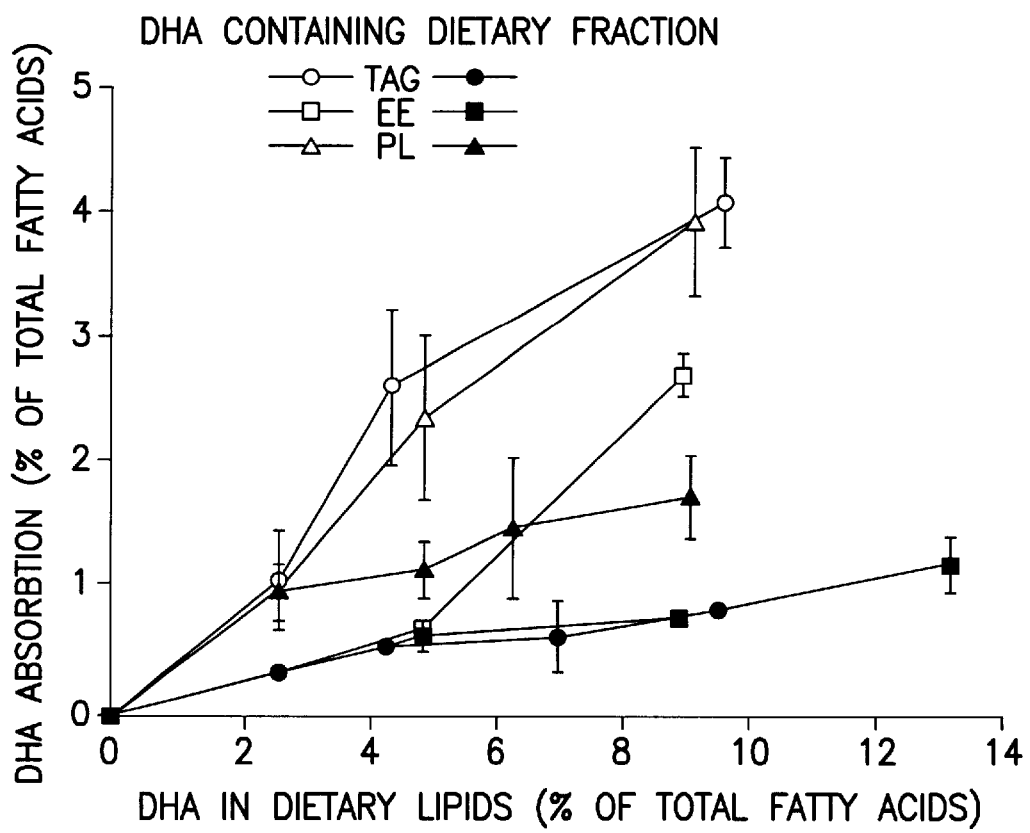
FIG. 6 is a graph showing absorption of DHA from neutral polar dietary lipids.

FIG. 6 describes DHA absorption in neutral (open symbols) and polar lipids (close symbols) of 8 hour enriched Artemia nauplii as a function of its dietary fraction delivery form. DHA was delivered in increasing level (0–13.21% of total fatty acids) only in one dietary fraction at a time (triacylglycerols (TAG), ethyl-esters (EE) or phospholipids (PL) fraction). Values are means±s.e. for three replicates.

Delivering DHA in PL or TAG lipid forms improved its absorption by the enriched Artemia as compared to unesterified form (FIG. 6). After 8 hours of enrichment, DHA accumulated mainly in the neutral fraction of Artemia lipids. Moreover, DHA incorporated into Artemia polar lipids only when delivered as dietary PL phospholipids delivering DHA in other dietary fractions resulted in incorporation into Artemia neutral lipid. In addition, enrichment efficiency of Artemia neutral lipids with DHA was highest when it delivered in dietary PL or TAG forms (43% of dietary DHA, $R^2=0.99$), and reduced substantially to 28% of dietary DHA ($R^2=0.89$) when it was delivered as unesterified-DHA. Furthermore, 7% of dietary DHA ($R^2=0.91$) was accumulated in Artemia polar fraction when it was delivered in PL fraction as compared to only 7.5% of dietary DHA ($R^2=0.95$) when it delivered in other dietary fractions.

Adult rotifers were treated with the previously described HUFA soap powders of the invention. The rotifers were treated by adding the soup powders to the respective tanks at the concentrations shown in Table 8 and 9. The fatty acid enrichment of this treatment with the soap powder is also shown in Tables 8 and 9. Table 8 shows the fatty acid enrichment after four hours of treatment and Table 9 showing the enrichment after eight hours of treatment, the rotifers were then collected and analyzed. Good ratios of n-3 to n-6 polyunsaturated fatty acids were obtained. It is noteworthy that the adult rotifers were converting 22:5n3 fatty acids to 20:5n3 fatty acids as the enrichment period was lengthened from 4 hours to 8 hours, therefore it may be important to carefully monitor the enrichment period.

of the diets, since the highly digestible and nutritionally balanced 75% mix diet resulted in maximal survival rate, while Artemia that fed on the poor digested whole intact cell algae were starving.

All types of carrier mixes (biomcal, Chlorella sp. and Tetraselmiss) were equally effective (P>0.05) in increasing the lipid content in the 16 h enriched Artemia (23.9–27.6%

TABLE 8

Summary of 4 hour enrichment (mg/g DBW rotifer).

| Lipid Class | 0.025 g/l | S.D.* | 0.050 g/l | S.D. | 0.1 g/l | S.D. | 0.2 g/l | S.D. |
|---|---|---|---|---|---|---|---|---|
| Total fatty acids | 77.98 | 45.27 | 54.55 | 19.78 | 66.49 | 15.71 | 103.02 | 24.90 |
| 22:6n3 | 2.21 | 2.22 | 1.30 | 0.39 | 2.91 | 0.73 | 9.03 | 2.56 |
| 22:5n3 | 2.98 | 2.68 | 3.18 | 1.19 | 3.78 | 0.756 | 5.00 | 1.75 |
| 20:5n3 | 11.84 | 5.36 | 8.70 | 3.36 | 9.48 | 1.72 | 12.58 | 4.31 |
| Total saturates | 22.92 | 15.32 | 14.53 | 5.21 | 17.70 | 4.30 | 25.88 | 5.67 |
| Total monounsaturates | 26.51 | 12.17 | 19.83 | 6.93 | 24.33 | 6.10 | 37.93 | 8.18 |
| Total polyunsaturates | 9.22 | 5.21 | 6.13 | 2.30 | 6.64 | 2.98 | 7.49 | 1.68 |
| Total n-3 polyunsaturates | 18.23 | 11.45 | 13.54 | 5.13 | 16.60 | 3.26 | 27.56 | 8.58 |
| Total n-6 polyunsaturates | 8.36 | 4.49 | 5.81 | 2.20 | 6.87 | 1.72 | 10.15 | 2.39 |
| n-3/n-6 | 2.12 | 0.26 | 2.33 | 0.07 | 2.44 | 0.17 | 2.68 | 0.25 |

*Standard deviation

TABLE 9

Summary of 8 hr. enrichment (mg/g DBW rotifer).

| Lipid Class | 0.025 g/l | S.D.* | 0.050 g/l | S.D. | 0.1 g/l | S.D. | 0.2 g/l | S.D. |
|---|---|---|---|---|---|---|---|---|
| Total Fatty Acids | 64.38 | 13.13 | 62.23 | 3.29 | 79.18 | 9.48 | 98.58 | 42.29 |
| 22:6n3 | 0.73 | 0.24 | 1.26 | .068 | 2.76 | 0.45 | 6.93 | 3.40 |
| 22:5n3 | 4.02 | 0.85 | 3.61 | 0.18 | 4.50 | 0.94 | 4.88 | 2.44 |
| 20:5n3 | 9.43 | 2.57 | 8.31 | 0.97 | 11.01 | 0.96 | 11.74 | 5.61 |
| Total Saturates | 17.23 | 3.39 | 16.77 | 1.83 | 21.37 | 2.54 | 26.01 | 9.86 |
| Total monounsaturates | 25.00 | 5.23 | 24.29 | 2.10 | 29.32 | 3.39 | 36.18 | 16.71 |
| Total polyunsaturates | 22.15 | 5.12 | 21.17 | 0.86 | 17.79 | 9.12 | 15.03 | 5.63 |
| Total n-3 polyunsaturates | 14.52 | 3.66 | 13.78 | 0.39 | 18.75 | 2.30 | 24.51 | 11.38 |
| Total n-6 polyunsaturates | 6.92 | 1.34 | 6.54 | 0.27 | 8.74 | 1.30 | 10.35 | 4.11 |
| n-3/n-6 | 2.09 | 0.18 | 2.11 | 0.05 | 2.15 | 0.06 | 2.32 | 0.21 |

*Standard deviation

The effects of feeding algae enriched with DHA was also examined.

Heterotrophically grown whole Chlorella sp., and Tetraselmiss pastes, whole cell and crushed cell as well as delipidated dry biomcal of Cryptecodinium sp. algae were obtained from Martek BioSci. Inc. All materials were freeze-dried prior being mixed with the DHA-PL fraction from the DHA-oil production process. Enrichment diets contained only DHA-PL or 3:1, 2:1 or 1:1 mix (dry weight base) of the DHA-PL with each of the freezed dried algae (Chlorella sp., Tetraselmiss and delipidated Cryptecodinium sp. biomeals). All enrichment mixtures were homogenized with water and freeze-dried once again in order to ensure the highest blending of all compounds.

The Artemia and Rotifer were cultured, and the lipids analyzed by the methods previously described.

Over 75% of the Artemia survived after 16 h of enrichment, with no significant effect (P>0.05) of carrier type (biomeal, Chlorella sp. and Tetraselmiss). However, a mixing proportion of 75% of any type of carrier with 25% DHA-PL resulted in highest survival rate of 94.6±1.1% as compared to only 75–79% in all other mixing proportions. Lowest survival rate of 63.7±1.4% was obtained when feeding the Artemia with whole Cryptecodinuim sp. cell. These survival results probably reflect the nutritional value dry weight). Mixing proportions of 25–50% of any carrier with DHA-PL was significantly more efficient (P<0.05) in increasing lipid content than 75% mixing level or than the DHA-PL (no carrier) diet. This suggests that the DHA-PL only diet is not an efficient diet for Artemia enrichment, while proper mixing of this material with a carrier such as biomeal and microalgae could significantly improve both its palatability and enrichment efficiency. Enrichment of the Artemia with whole cell or crushed cell algae was significantly less efficient (P>0.05) in increasing lipid content than the DHA-PL only diet or than any of the mixed diet. However, crushed cell diet perform slightly better than the whole cell diet (19.1% versus 17.0% dry weight), indicating that Artemia nauplii can not take up and efficiently digest the large particle size (>40 $\mu$m) of the whole cell Cryptecodinium sp. algae.

Biomeal, Chlorella sp. and Tetraselmiss carriers were as efficient as the DHA-PL (P>0.05) in delivering dietary DHA to the Artemia (20–30 mg/g dry weight). While whole cell and crushed cell algae were the least efficient (7.8–10.5 mg/g dry weight). Dietary proportions of 25–50% of any carrier with the DHA-PL were significantly better in delivering DHA to the Artemia (26.2–28.0 mg/g dry weight, P<0.05) than the DHA-PL alone diet or the 75% mix diet (13–16.1 mg/g dry weight).

In Table 10 the amount of lipid as a percentage of body weight is examined as a function of the feed material.

TABLE 10

Lipid (% dw)

|  | Count | Mean | Std. Dev. | Std. Err. |
|---|---|---|---|---|
| Biomeal | 9 | 27.60 | 1.34 | .45 |
| Chlorella | 9 | 26.10 | 2.97 | .99 |
| Crushed Cell | 3 | 19.05 | 3.35 | 1.93 |
| No Carrier | 3 | 27.11 | 1.60 | .92 |
| Tetraselmis | 8 | 23.92 | 2.12 | .75 |
| Whole Cell | 3 | 17.04 | 2.63 | 1.52 |

*One case was omitted due to missing values.

In Table 11, the percentage of DHA as a percentage of total fatty acids is examined as a function of the feed material.

TABLE 11

DHA as % of total FA

|  | Count | Mean | Std. Dev. | Std. Err. |
|---|---|---|---|---|
| Biomeal | 9 | 19.83 | 1.31 | .44 |
| Chlorella | 9 | 16.97 | 4.40 | 1.47 |
| Crushed Cell | 3 | 13.74 | 4.56 | 2.63 |
| No Carrier | 3 | 20.58 | 1.32 | .76 |
| Tetraselmis | 8 | 16.26 | 2.86 | 1.01 |
| Whole Cell | 3 | 9.56 | .78 | .45 |

*One case was deleted due to missing values.

Survival of rotifers was very sensitive to the level of the enrichment diet. At 0.1 g/liter of enrichment level, only 49.7% of rotifers survive after 8 h of enrichment, independent of carrier type and percentage ($P>0.05$). Reduced enrichment level to 0.05g/liter was associated with a significantly better survival rate (80.9%, $P<0.05$). Survival rates were high also when rotifers fed on whole cell or crushed cell algae (81.7–89.9%).

Reduced enrichment level (from 0.1 g/liter to 0.05g/liter) was not associated with a significant reduction in lipid content (about 20% dry weights $P>0.05$). All carrier types (biomeal, Chlorella sp. and Tetraselmiss) at 25–75% mixing proportions with the DHA-PL were equally effective in increasing the lipid content in 8 h enriched rotifers (21.1–22.5% dry weight). Whole intact cell algae was the least efficient diet in increasing the lipid content (10.7±1.3% dry weight) in rotifers, but feeding rotifers with crushed cell algae diet was associated with a significantly improved lipid absorption (16.3±0.9% dry weight, $P<0.05$).

Although rotifer enrichment at 0.05–0.1 g/liter dietary levels resulted in a similar absorption of dietary lipids, DHA accumulation was more than twice at the higher enrichment level (28.0±1.4 mg/g dry weight at 0.1 g/liter as compared to 12.0±1.1 mg/g dry weight at 0.05 g/liter). All types of carriers at any mixing level (0–75%) including the DHA-PL only diet were equally effective ($P>0.05$) in delivering the dietary DHA to the rotifers. Whole cell algae was the least efficient diet in delivering the DHA to the rotifers (only 6.0±1.4 mg/g dry weight). However, crushed cell algae was highly efficient for DHA delivery to the rotifers (23.6±2.1 mg/g dry weight). This DHA level in the enriched rotifers was similar to the levels obtained by other effective DHA-PL based diets ($P>0.05$). The observed low correlation between lipid and DHA contents in the rotifers as compared to the high correlation in the Artemia may suggests that rotifers are very efficient in absorbing dietary DHA and also catabolize it at much lower rates than Artemia.

TABLE 12

Survival of Rotifers (8 hours)

|  | Count | Mean | Std. Dev. | Std. Err. |
|---|---|---|---|---|
| Biomeal | 15 | 52.933 | 23.574 | 6.087 |
| Chlorella | 15 | 58.067 | 34.385 | 8.878 |
| Crushed Cell | 6 | 81.667 | 5.989 | 2.445 |
| No Carrier | 6 | 64.333 | 3.697 | 1.509 |
| Tetraselmis | 9 | 55.444 | 14.621 | 4.874 |
| Whole Cell | 6 | 89.917 | 6.636 | 2.709 |

TABLE 13

DHA (% of total FA) in 8 hour enriched rotifers

|  | Count | Mean | Std. Dev. | Std. Err. |
|---|---|---|---|---|
| Biomeal | 15 | 25.59 | 10.67 | 2.75 |
| Chlorella | 15 | 18.55 | 10.25 | 2.65 |
| Crushed Cell | 6 | 36.19 | .99 | .40 |
| No Carrier | 6 | 24.60 | 5.19 | 2.12 |
| Tetraselnis | 9 | 24.77 | 2.14 | .71 |
| Whole Cell | 6 | 22.26 | 6.47 | 2.64 |

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable riles of law.

What is claimed is:

1. A method for increasing the ratio of docosahexaenoic acid to eicosapentaenoic acid in the live prey of larval fish comprising administering a highly unsaturated fatty acid soap powder comprising fatty acids with a highly unsaturated fatty acid ratio greater then about one part docosahexaenoic acid to one part eicosapentaenoic acid to the live prey.

2. A method of feeding fish in a fish hatchery or fish farm comprising the steps:
   a. providing larval fish in said fish hatchery or fish farm;
   b. feeding said larval fish live prey enriched with a highly unsaturated fatty acid soap.

3. The method of claim 2, wherein a counter-ion of the fatty acid is selected from sodium, potassium, calcium and mixtures thereof.

4. The method of claim 2, wherein the live prey is selected from Artemia nauplii, copepods and rotifers.

5. The method of claim 4, wherein the live prey is Artemia nauplii.

6. The method of claim 5, wherein the Artemia nauplii are in the second naupliar stage.

7. The method of claim 2 wherein the highly unsaturated fatty acid soap is administered to said live prey in powder form.

8. The method of claim 2 wherein the live prey have a ratio of docosahexamoic acid to eicosapentacnoic acid of about 1.0 to 1.0 to about 2.0 to 1.0.

9. The method of claim 2 wherein the highly unsaturated fatty acid soap comprises the following fatty acids: from about 8% to about 16% C14:0, from about 0.75% to about 2.50% C16:1ω7, from about 9% to 13% C16:0, from about 7.5 to 10.5% C18:2ω6, from about 30 to 55% C18:1ω9, from about 0.01% to about 2.5% C18:1ω7, from about 2% to about 4.5% C20:4, and from about 8.5 to about 28% C22:6ω3.

10. The method of claim 2 wherein the highly unsaturated fatty acid soap further includes antibiotics, vitamins, essential amino acids, carotenoids, pigments or mixtures thereof.

11. A method of feeding marine larval fish for enhanced nutrition thereof, comprising furnishing said marine larval fish with live prey that have been nutritionally enriched by feeding said live prey a highly unsaturated fatty acid soap.

12. The method of claim 11, wherein the highly unsaturated fatty acid soap comprises a highly unsaturated fatty acid soap powder comprising the following fatty acids: from about 8% to about 16% C14:0, from about 0.75% to about 2.50% C16:1ω7, from about 9% to 13% C16:0, from about 7.5% to about 10.5% C18:2ω6, from about 30% to about 55% C18:1ω9 from about 0.01% to about 2.5% C18:1ω7, from about 2% to about 4.5% C20:4, and from about 8.5% to about 28% C22:6ω3.

13. The method of claim 11, wherein the nutritionally enriched live prey have an increased ratio of docosahexanoic acid to eicosapentaenoic acid attributable to nutritional enrichment with said highly unsaturated fatty acid soap.

14. The method of claim 11, wherein the highly unsaturated fatty acid soap comprises a soap powder having a particle size of less than about 10 microns.

15. The method of claim 14, wherein the particle size of the soap powder is less than about 7.5 microns.

16. The method of claim 15, wherein the particle size of the soap powder is from about 1 micron to about 5 microns.

17. The method of claim 11,
wherein said live prey comprise artemia nauplii, said highly unsaturated fatty acid soap comprises a highly unsaturated fatty acid soap powder, and said live prey as nutritionally enriched have a
ratio of docosahexanoic acid to eicosapentanoic acid greater than 1.

18. The method of claim 17, wherein the enrichment is allowed to continue to the point where the ratio docosahexanenoic acid to eicosapentaenoic acid is greater than about 1.0 to 1.0.

19. The method of claim 17, wherein the enrichment is allowed to continue to the point where the ratio docosahexaenoic acid to eicosapeutaenoic acid is greater than about 1.5 to 1.0.

20. The method of claim 17 wherein the enrichment is allowed to continue to the point where the ratio of docosahexaenoic acid to eicosapentaenoic acid is greater than about 2.0 to 1.0.

21. The method of claim 17 wherein the highly unsaturated fatty acid soap powder comprises the following fatty acids: from about 8% to about 16% C14:0, from about 0.75% to about 2.50% C16:1ω7, from about 9% to 13% C16:0, from about 7.5 to 10.5% C18:2ω6 from about 30 to 55% C18:1ω9 from about 0.01% to about 2.5% C18:1ω7, from about 2% to about 4.5% C20:4 and from about 8.5 to about 28% C22:6ω3.

22. The method of claim 17, wherein said live prey comprise a third naupliar stage of said artemia nauplii.

23. The method of claim 17, wherein said highly unsaturated fatty acid soap is fed to the live prey with a carrier selected from the group consisting of biomeal, Chlorella, Tetraselmis and mixtures thereof.

24. The method of claim 11, further comprising furnishing a mixture of algae with said highly unsaturated fatty acid soap to the live prey, wherein said highly unsaturated fatty acid soap comprises a highly unsaturated fatty acid soap powder having a ratio of docohexaenoic acid to eicosapentaenoic acid greater than 1.

25. The method of claim 24, wherein the highly unsaturated fatty acid soap powder comprises the following fatty acids: from about 8% to about 16% C14:0, from about 0.75% to about 2.50% C16:1ω7, from about 9% to 13% C16:0, from about 7.5 to 10.5% C18:2ω6 from about 30 to 55% C18:1ω9 from about 0.01% to about 2.5% C18:1ω7, from about 2% to about 4.5% C20:4 and from about 8.5 to about 28% C22:6ω3.

26. The method of claim 24, wherein a counter-ion of the fatty acid is selected from sodium, potassium, calcium and mixtures thereof.

27. The method of claim 24, wherein the soap powder has a particle size of less than about 10 microns.

28. The method of claim 11, wherein said highly unsaturated fatty acid soap is formed by alkaline wash of an oil selected from the group consisting of fish oils and algae oils to yield an aqueous alkaline solution comprising a highly unsaturated fatty acid soap, followed by spray drying of the aqueous alkaline solution, to yield said highly unsaturated fatty acid soap.

* * * * *